United States Patent [19]
Taylor et al.

[11] Patent Number: 5,454,444
[45] Date of Patent: Oct. 3, 1995

[54] VEHICLE ASSEMBLY FOR USE IN AGRICULTURE

[76] Inventors: Stanley E. Taylor, P.O. Box 229, Moree, Australia, 2400; Doyle R. Thompson, "Rosalie" M/S 1049, Lavender Road, Meringandan, Queensland, 4352, Australia

[21] Appl. No.: 178,916

[22] Filed: Jan. 7, 1994

[30] Foreign Application Priority Data

Jan. 8, 1993 [AU] Australia ................................. PL6727
Aug. 17, 1993 [AU] Australia ................................. PM0643

[51] Int. Cl.⁶ .................................................. B60K 26/00
[52] U.S. Cl. ...................... 180/321; 280/32.5; 56/327.1
[58] Field of Search ...................... 180/315, 321, 180/335; 280/497, 500, 496, 32.5; 172/432, 433, 436; 56/323, 473.5, 327.1

[56] References Cited

U.S. PATENT DOCUMENTS

| | | | |
|---|---|---|---|
| 1,748,745 | 2/1930 | Zuckerman | 56/327.1 |
| 2,378,847 | 6/1945 | Harris | 56/327.1 |
| 3,127,036 | 3/1964 | Cunningham et al. | 280/32.5 |
| 3,342,353 | 9/1967 | Davis | 280/32.5 |
| 3,515,234 | 6/1970 | Danford et al. | 280/32.5 |
| 4,280,711 | 7/1981 | Gorder | 280/32.5 |
| 4,526,248 | 7/1985 | Johansen | 280/32.5 X |
| 4,527,656 | 7/1985 | Walbridge | 180/321 |

*Primary Examiner*—Mitchell J. Hill
*Assistant Examiner*—Christopher Ellis
*Attorney, Agent, or Firm*—Dvorak and Traub

[57] ABSTRACT

A vehicle assembly 20 which may be used for the purpose of selectively spraying weed killing chemicals onto weeds located amongst crops 21 planted in rows 22. The vehicle assembly 20 includes four user support assemblies 23, namely a master control support assembly 100 and three slave control support assemblies 101, supported by support means 24 and 84 on transportation means 25 which is capable of movement along the furrows such that the user assemblies 23 are positioned above respective rows 22 of crops. The master control user support assembly 100 is provided with direction control means 67 for selectively controlling the movement of the vehicle assembly in either a forward or a reverse direction and steering actuation means 68 for steering the vehicle assembly 20 and wherein the remainder of said user support assemblies 101 are slave control positions having direction control means 72 for selectively controlling the movement of the vehicle assembly in either a forward or a reverse direction.

6 Claims, 7 Drawing Sheets

VEHICLE ASSEMBLY FOR USE IN AGRICULTURE

FIELD OF THE INVENTION

This invention relates to a vehicle assembly.

This invention has particular but not exclusive application to a vehicle assembly for selectively spraying weed killing chemicals onto weeds located amongst crops planted in rows, and for illustrative purposes reference will be made to such application. However, it is to be understood that this invention could be used in other applications, such as a vehicle assembly which may be used for planting, spraying, inspecting and/or harvesting of crops.

DESCRIPTION OF THE PRIOR ART

Typically cotton bushes are planted in rows and persons, referred to as "chippers", preferably at least twice during the growth of each crop, walk along the length of each furrow manually removing weeds and the like which may otherwise compete with the crops for water and nutrients. As weeds may readily propagate it is important that the "chippers" remove as many of the weeds as possible. Consequently to effectively weed fields large numbers of contracted laborers are employed.

It will be appreciated that the process of removing weeds described above is laborious, time consuming and rather expensive. Furthermore, due to the close proximity of adjacent rows, mature plants often obstruct the path therebetween and as a consequence "chippers" must pries apart adjacent plants in order that they may walk along the length of each furrow. This of course retards the progress of each "chipper" and may be hazardous where the "chipper" is repeatedly brushing against plants which have been previously sprayed with harmful insecticides and the like.

It is also noted that tractors and the like equipped with a storage tank operatively connected to a plurality of nozzles mounted on a boom extending outwardly therefrom in a direction generally transverse to the direction of travel are used to spray crops with insecticides. Typically the vehicles are driven along the furrows such that the nozzles are positioned above the crops. Unfortunately vehicles of the type described due to their configuration may not be used to spray some crops when fully grown.

SUMMARY OF THE INVENTION

The present invention aims to alleviate one or more of the above disadvantages and to provide a vehicle assembly which will be reliable and efficient in use.

With the foregoing in view, this invention in one aspect resides broadly in a vehicle assembly including transportation means capable of movement in both a forward and a reverse directions;

drive means for driving said transportation means in both forward and reverse directions;

a user support assembly for supporting a respective user in an aspect suitable for performing an operation;

support means mounted on said transportation means for supporting said user support assembly in an elevated position remote from said transportation means, and direction control means, operable by a user supported by said user support assembly, for selectively controlling movement of said transportation means in either a forward or a reverse direction.

The transportation means may comprise a frame or the like supported by mobile support means such as wheels or runners adapted for movement along the ground. In one embodiment, the frame may be supported by frame support means in an elevated position above the mobile support means such that the frame may move freely above crops and other objects located on the ground.

In one embodiment, the transportation means may include at least three ground engaging wheels including for example a pair of forwardly located driven wheels and a rear wheel which in one embodiment may be in the form of a castor.

In an alternative or preferred embodiment, the transportation means may include four wheels including a pair of forwardly located wheels and a pair of rearwardly located wheels and wherein the forwardly located wheels and/or the rearwardly located wheels may be operatively connected to a source of power.

The transportation means may further include anti-fouling means which may at least partially prevent extraneous matter from fouling movement of the mobile support means or from otherwise engaging or becoming entangled with the frame support means.

In one embodiment the anti-fouling means may include guards or shields positioned in front of, behind and on either side of each wheel, runner and selected elements of the frame support means.

The anti-fouling means may in use also assist in the displacement of any ground cover or objects obstructing or hindering the passage of the transportation means. Accordingly, the orientation of the guards or shields relative to the mobile support means may be adapted to deflect ground cover away therefrom.

In one embodiment the vehicle assembly may be adapted to be pushed or pulled by another vehicle or the like. However it is preferred that the vehicle assembly be independently driven by a power source or drive means which may include a motor including an electric motor or a hydrostatic motor, an internal combustion engine or a machine operatively connected to the mobile support means which in use will impart motion thereto.

In one embodiment motion is provided by a single motor or machine operatively connected to the driven mobile support means. In an alternative embodiment, the transportation means may include at least one pair of laterally spaced runners or wheels each individually driven by respective motors or machines.

Actuation of the drive means may be controlled by actuation means such as a switch operable by for example a user supported by a user support assembly and/or by a person supported on the transportation means.

The maximum speed at which the mobile support means may be driven may be selectively controlled by maximum speed control means which may be preset prior to commencement of use of the vehicle. For example, the maximum speed control means may be preset at five kilometers per hour and whereby the maximum speed at which the vehicle assembly may be driven in either a forward or a reverse direction is five kilometers per hour.

In order to steer the vehicle assembly, the vehicle assembly may further include steering means operable by a user supported by a user support assembly and/or by a user supported on the transportation means.

For example, the steering means may include a single ground engaging wheel, or a pair of ground engaging wheels, which are capable of rotation about a substantially vertical or an inclined axis and which may be operatively connected to steering actuation means operable by a user such as a steering wheel, control column or foot pedal(s).

In an alternative embodiment, steering or sideways movement of the vehicle may be achieved by controlling the simultaneous actuation and direction of operation of respective drive means operatively connected to opposing mobile support means and wherein there may be provided steering actuation means such as a pair of foot pedals which control both the forward and reverse operation of respective drive means. Furthermore, the speed at which the mobile support means may be driven may also be controlled by the steering actuation means.

In yet another embodiment, the steering means may include braking means for retarding the motion of selected mobile support means. For example, a user may be provided with two foot pedals, ie. a brake pedal which controls the application of a breaking force to a selected mobile support means and a speed controlling pedal which controls the speed, both forward and reverse at which the mobile support means are driven. The brake pedal may be capable of pivotal movement in both a forward and a reverse direction relative to a neutral position and wherein the application of a braking force to respective mobile support means is controlled by the force applied to the braking pedal by the toe or heel of a driver's foot.

In yet another embodiment, the steering means may be automatic whereby the intended direction of travel of the vehicle assembly may be pre set such as to follow a row of crops. Sensors may also be provided to monitor the relative position of crops or the like and to initiate changes in direction.

In the preferred embodiment the steering actuation means is actuated by a part of the user's body other than the user's hands which are then free to perform an operation such as operation of spraying apparatus. For example, the steering actuation means may be actuated by a person's knees. Alternatively, the user's feet or a selected foot may be used to control the steering of the vehicle assembly.

The user support assembly is supported in a position remote from the transportation means by support means such as a beam, a platform, or a plurality of frame members. In one embodiment, the support means may be hingedly connected to the transportation means thereby permitting the support means and thus the user support assembly supported thereon to be folded back against the transportation means. In an alternative embodiment the support means may be releasably attached to the transportation means and may be detached therefrom for the purposes of storage and transportation from work site to work site.

The location of the user support assembly along the length of the support means may be variable. Similarly the spacing of the user support assembly either above or below the support means and the orientation of the user support assembly about both horizontal and vertical axes may be selectively variable.

The user support assembly may include a seat on which a user may sit, a platform upon which a user may lie or a harness adapted to support the user in a suspended attitude. Accordingly, the aspect of the user may be selected according to its suitability for the operation to be performed. For example, if the user is to perform an operation on an object above the user, such as applying a surface coating to a downwardly facing surface or overhanging branches of a plant, the user support apparatus may be adapted for supporting the user in a recumbent position whereby access to the surface is made convenient for the user.

In an alternative embodiment, the aspect of the user may be selectively variable. For example, the user support apparatus may be a reclinable seat whereby the user may select either a seated aspect or a recumbent aspect, or any aspect therebetween so that, in spraying, harvesting or inspecting a crop, the user has convenient access to the ground as well as to the portion of the plants above the user, and may adjust the position of the seat to afford access between objects not separated sufficiently for passing between in a seated aspect. The seat may also be permitted to rotate about a vertical axis.

To shield the user from the effects of the weather, the user support assembly may be provided with shade means such as a cover which may be retractable or a cabin which may be at least partially enclosed.

In addition to steering actuation means, which in one embodiment may be transferrable from one position occupied by a user including a position on the transportation means itself, to any other user supporting position, there may be provided a master control support assembly which may further include direction control means and speed control means for controlling the direction of movement of the transportation means in a substantially forward and reverse direction and wherein operation the operation of the direction control means may be independent of the steering means.

In the preferred embodiment the direction control means of the master control support assembly includes a single foot pedal which is electrically or hydraulically operatively connected to the drive means and wherein depression of the pedal with the toe of the user's foot results in increasing forward motion of the vehicle assembly, limited by the maximum speed as determined by the maximum speed control means, and wherein depression of the pedal with the heal of the user's foot results in increasing rearward motion of the vehicle, again limited by the maximum speed. The pedal is preferably maintained in a neutral or inoperative position by biasing means such as a pair of springs located beneath the toe and heel positions of the pedal.

Each of the remaining user support assemblies or slave control support assemblies shall be provided with direction control means for controlling the direction of movement of the transportation means in a substantially forward or reverse direction and wherein the direction control means may also include speed control means by which the speed of the driven mobile support means may be controlled and wherein the operation of said speed control means may be independent of or limited by the maximum speed control means.

In one embodiment the user may be provided with direction control means comprising two foot pedals and wherein the depression of one pedal causes the deceleration of the transportation means in the forward direction whilst the depression of the other pedal causes the transportation means to accelerate in the reverse direction.

In the preferred embodiment the direction control means includes a single foot pedal which is electrically or hydraulically operatively connected to the drive means and wherein depression of the foot pedal between its inoperative poison and a neutral position will cause the drive means to operate at decreasing speeds or to cease driving the mobile support means and hence may cause the vehicle assembly to decelerate or to come to a halt. Further depression of the foot pedal beyond the neutral position will cause the drive means to operate in reverse at gradually increasing speeds.

Preferably the direction control means when not required is maintained in an inoperative position by biasing means such as a spring and whereby the transportation means is permitted to travel in a forward direction at the maximum speed dictated by the maximum speed control means.

In the preferred embodiment the vehicle assembly is used to selectively spray weeds, located amongst crops planted in rows, with herbicides and wherein each user is provided with an applicator such as a spraying apparatus or spay gun which is operatively connected to fluid storage means mounted either on the transportation means or the user support assembly. There may also be provided fluid delivery means, such as lengths of hose, for delivering the fluid from the storage means to all or selected applicators.

In another aspect, this invention resides broadly in a vehicle assembly including a plurality of control positions, wherein one of said control positions is a master control position having maximum speed control means for controlling the maximum speed at which the vehicle assembly may be driven, direction control means for selectively controlling the movement of the vehicle assembly in either a forward or a reverse direction and steering actuation means for steering the vehicle assembly and wherein the remainder of said control positions are slave control positions having direction control means for selectively controlling the movement of the vehicle assembly in either a forward or a reverse direction. In one embodiment the directional control means may override the maximum speed control means of the master control position.

BRIEF DESCRIPTION OF THE DRAWINGS

In order that this invention may be more readily understood and put into practical effect, reference will now be made to the accompanying drawings which illustrate a typical embodiment of the invention and wherein.

DESCRIPTION OF THE PREFFERRED EMBODIMENTS

Figure 1:
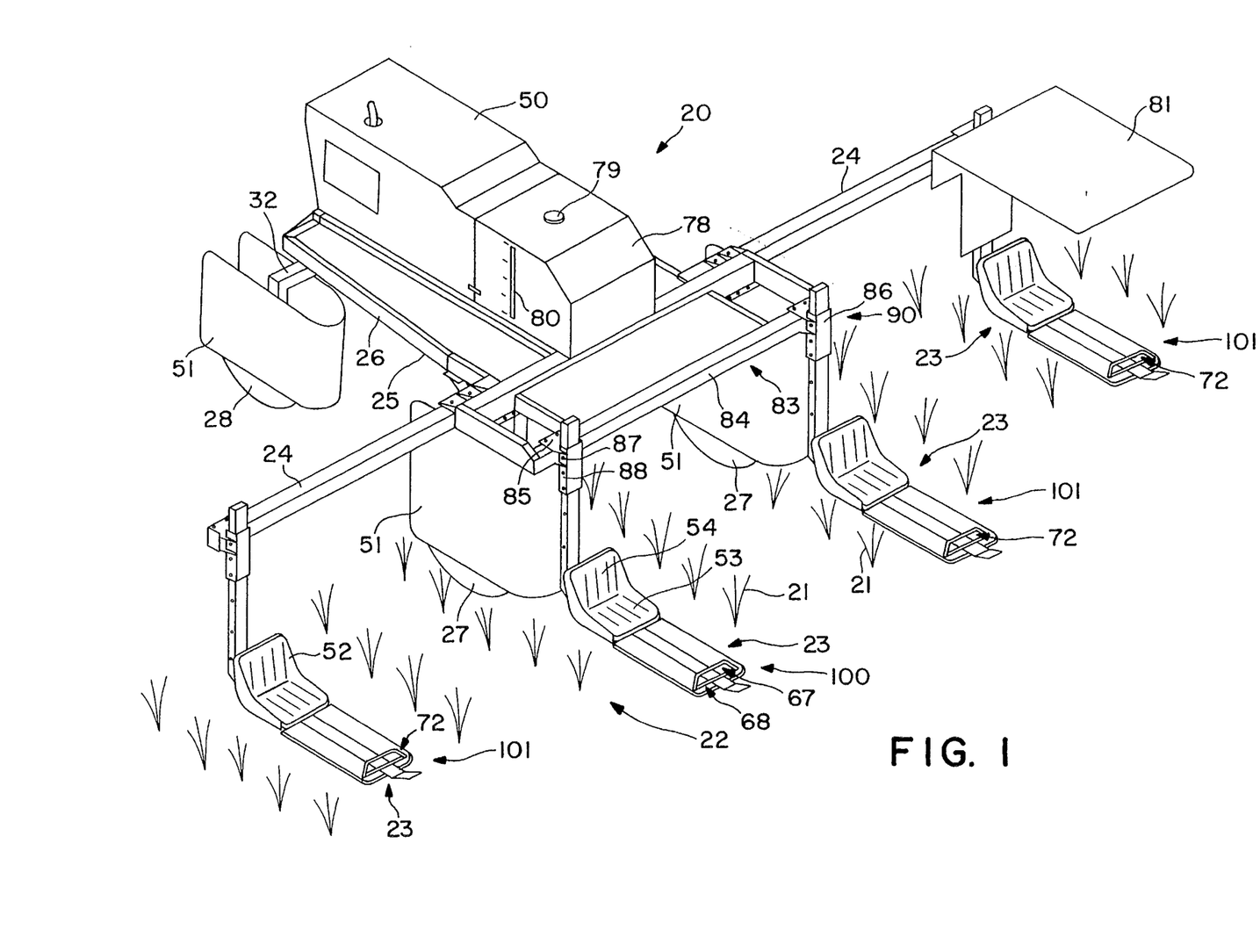
FIG. 1 is a perspective view of a vehicle assembly constructed in accordance with the present invention.

FIG. 1 illustrates a vehicle assembly 20 which may be used for the purpose of selectively spraying weed killing chemicals onto weeds located amongst crops 21 planted in rows 22. The vehicle assembly 20 includes four user support assemblies 23, namely a master control support assembly 100 and three slave control support assemblies 101, supported by support means 24 on transportation means 25 which is capable of movement along the furrows such that the user assemblies 23 are positioned above respective rows 22 of crops.

Figure 2:
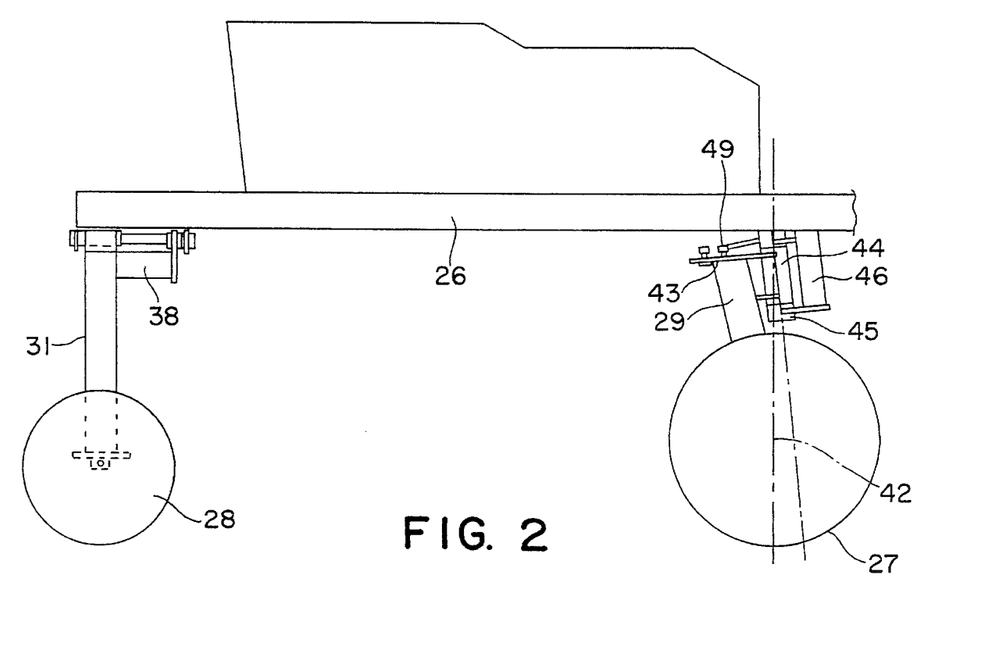
FIG. 2 is a side view of the vehicle assembly illustrated in FIG. 1, but wherein the user support assemblies are not shown.

The transportation means 25 comprises a wheeled carriage including a platform 26 supported by a pair of forwardly located driven wheels 27 and a pair or rearwardly located wheels 28.

The platform 26 is spaced above the crops by elongate drive wheel support arms 29 and a rear wheel support assembly 30.

Figure 4:
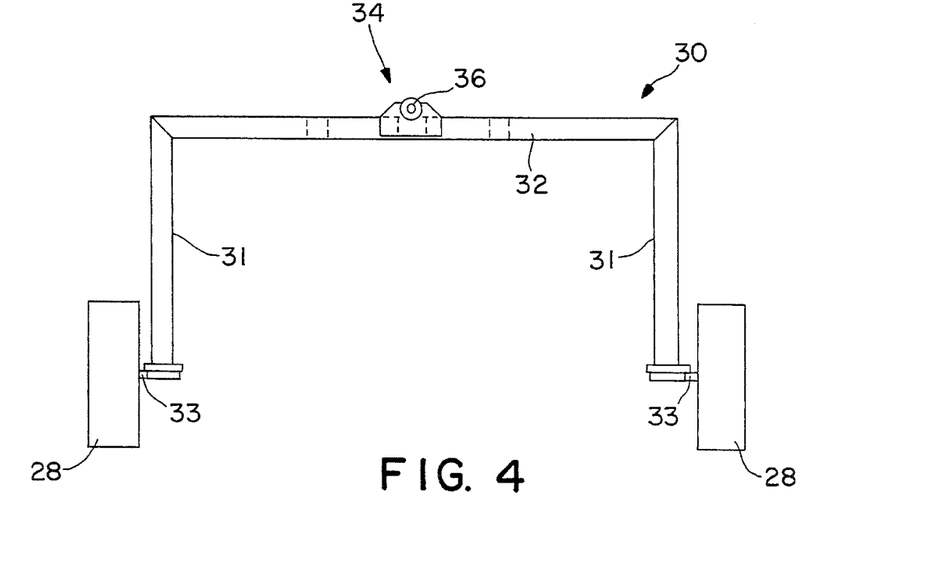
FIG. 4 is a detailed front view of a rear wheel assembly of the vehicle assembly illustrated in FIG. 1.

The rear wheel support assembly 30 includes a pair of opposing upstanding support arms 31 separated at their respective upper ends by an intermediate member 32. The rear wheels 28 are each free to rotate about a respective horizontally disposed axle 33 mounted on and extending outwardly from the lower end of each supporting arm 31.

The rear wheel support assembly 30 is also provided with mounting means 34 for pivotally mounting the rear wheel support assembly 30 on the underside of the platform 26 including a pair of mounting brackets 35 mounted on opposing sides of the intermediate member 32 midway between the opposing ends thereof. The mounting brackets 35 support a horizontally disposed sleeve 36.

The mounting means 34 is also provided with a third mounting bracket 37 spaced horizontally from and connected to one of the mounting brackets 35 by a spacing member 38. The mounting bracket 37 provides support for a second horizontally disposed sleeve 39 which is aligned with the former sleeve 36.

The mounting means 34 is pivotally connected to the underside of the platform 26 by a pin 40 which extends through sleeves 36 and 39 and which is supported at it's ends by a pair of opposing mounting brackets 41 dependent from the platform 26.

Figure 3:
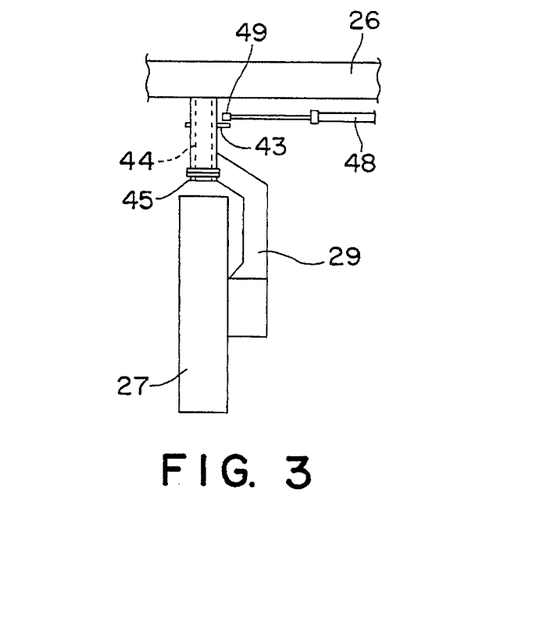
FIG. 3 is a detailed front view of a front wheel assembly of the vehicle assembly illustrated in FIG. 1.

Each driven wheel 27 rotates about a horizontally disposed axle 42 which extends outwardly from and is supported by the lower end of a respective vertically disposed, rearwardly inclined, drive wheel support arm 29.

The upper end of each drive wheel support arm 29 is rigidly connected to a primary linkage member 43 which extends outwardly therefrom in opposing directions, on end of which is rigidly connected to a sleeve 44 which is free to rotate about a rearwardly inclined pin 45 which is supported at its upper and lower ends by a mounting assembly 46 dependent from the platform 26.

Figure 5:
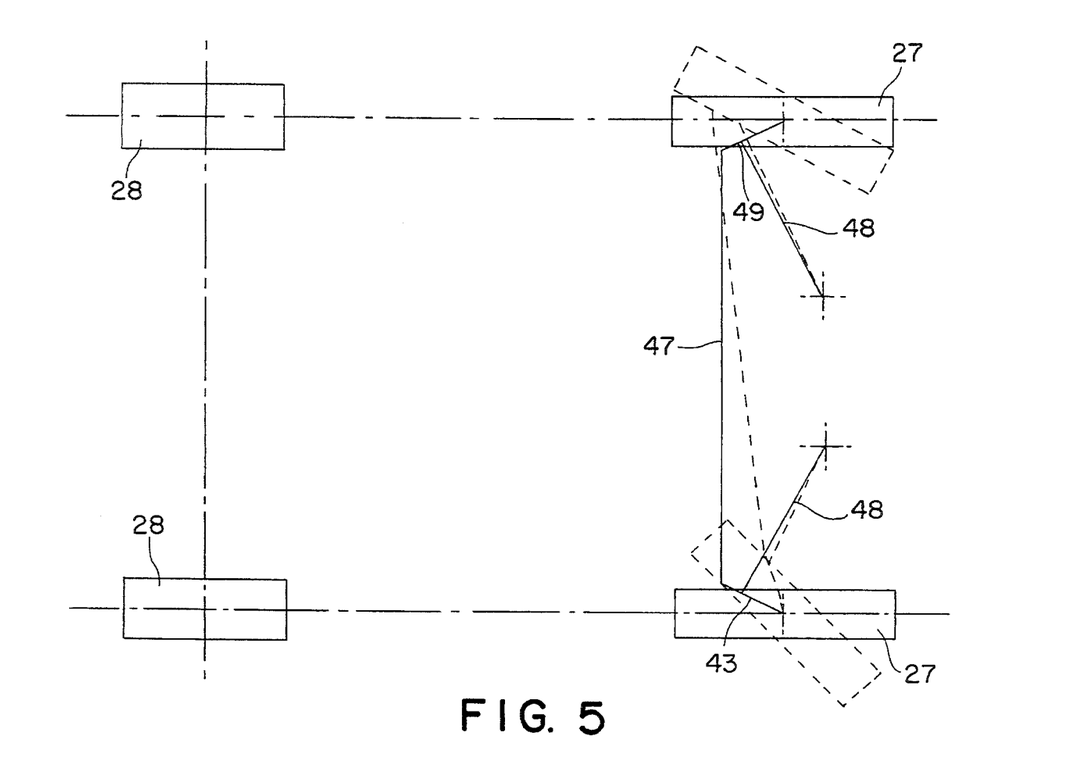
FIG. 5 is a schematic plan view of the four wheels and the steering means of the vehicle assembly illustrated in FIG. 1.

The upper ends of each drive wheel support arm 29 are also operatively interconnected by steering means comprising a three piece linkage including an intermediate linkage member 47 pivotally connected at each end to a respective primary linkage member 43.

The steering means also includes a pair of hydraulic rams 48 each rigidly connected to the underside of the platform 26 and wherein the free end 49 of each ram 48 is pivotally connected to a respective primary linkage member 43 intermediate the opposing ends thereof.

The forward wheels 27 are driven by a hydrostatic transmission, not shown, mounted on the platform 26 and housed within a cowling 50.

The transportation means 25 also includes antifouling means including shields 51 mounted on either side of each of the driven wheels 27 and each of the rearward wheels 28 and whereby the shields, which cover much of the leading portion of each wheel and the supporting arms, prevent extraneous matter including crops from becoming entangled about the wheels 27 and 28 and their supporting arms 29 and 31.

Figure 10:
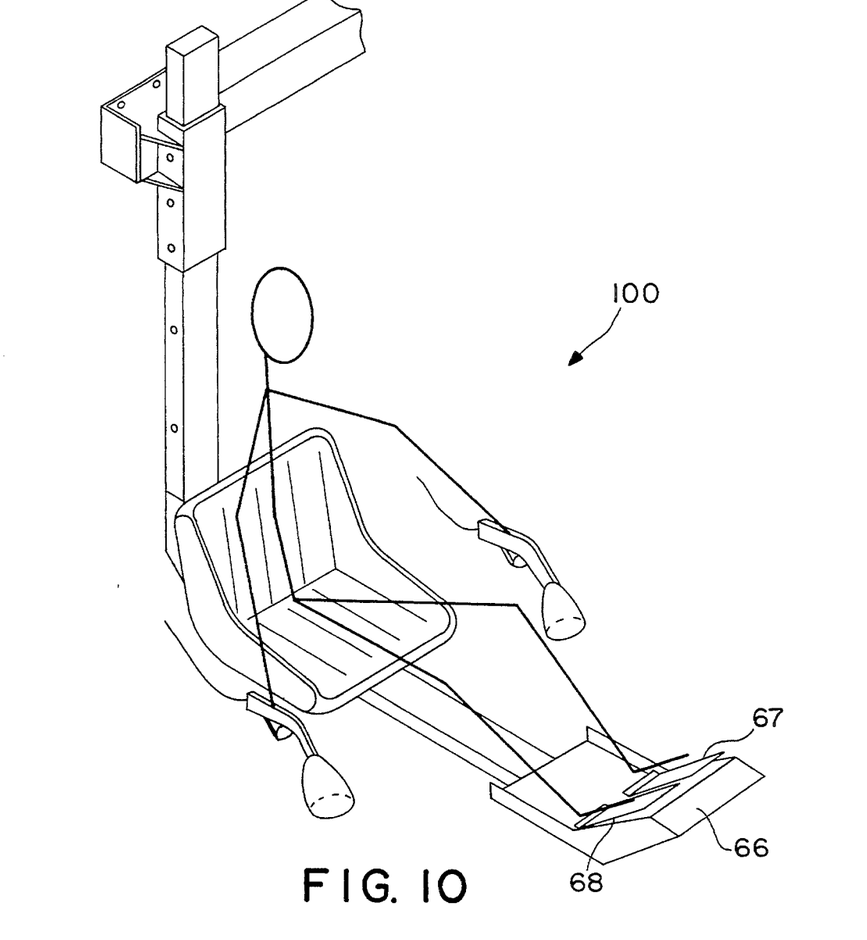
FIG. 10 is a perspective view of a master control support assembly constructed in accordance with the present invention.
Figure 12:
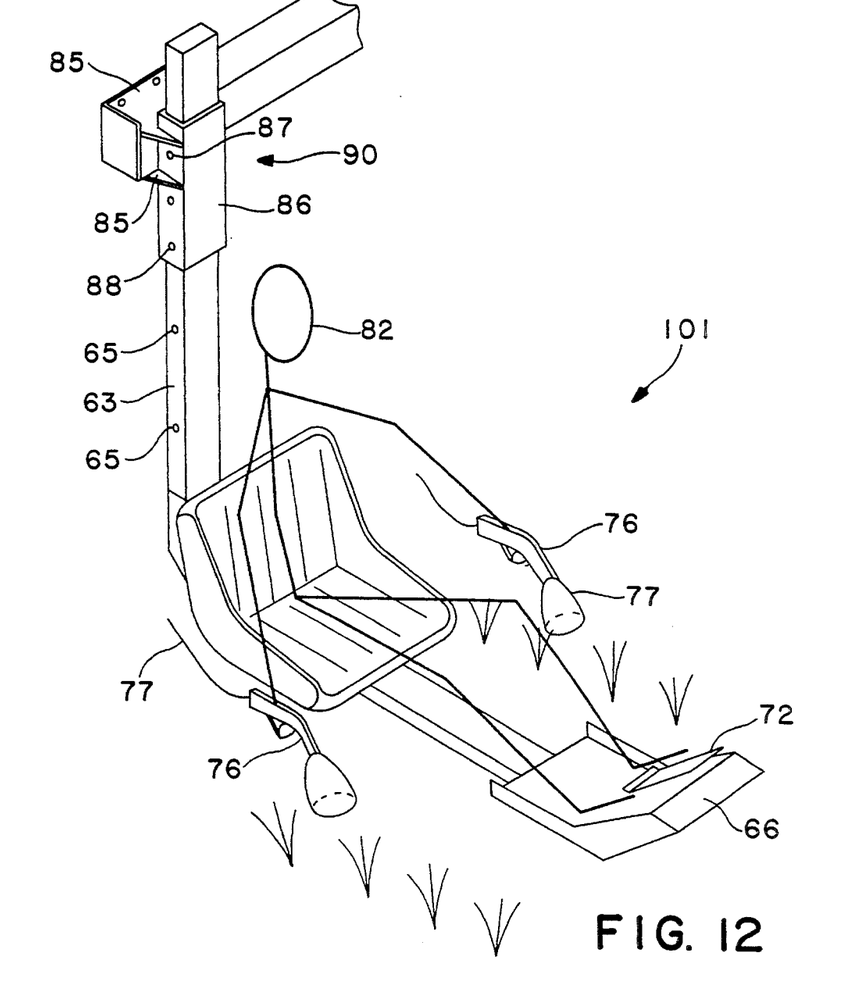
FIG. 12 is a perspective view of a slave control support assembly constructed in accordance with the present invention.

Each user support assembly 23 includes a chair 52 having a seat 53 and a back rest 54 and wherein the seat 53 is mounted on a mounting bracket 55 which is slidably mounted on a horizontally disposed chair supporting arm 56. One end 57 of the chair supporting arm extends beyond the leading edge of the chair 52 and provides support for a foot support assembly. The other end 58 of the chair supporting arm 56 includes a vertically orientated mounting portion 59 to which there are attached opposing plate like mountings 60.

Figure 6:
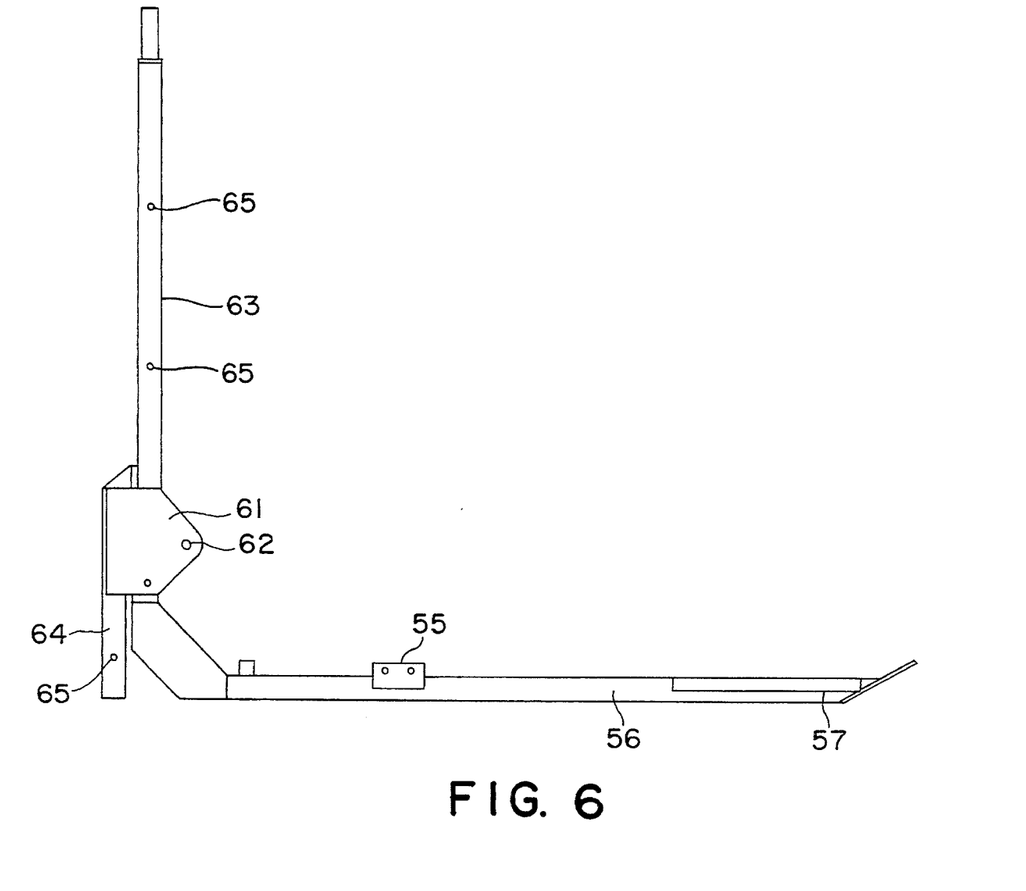
FIG. 6 is a side view of the mounting means for mounting a user support assembly on the support means.
Figure 8:
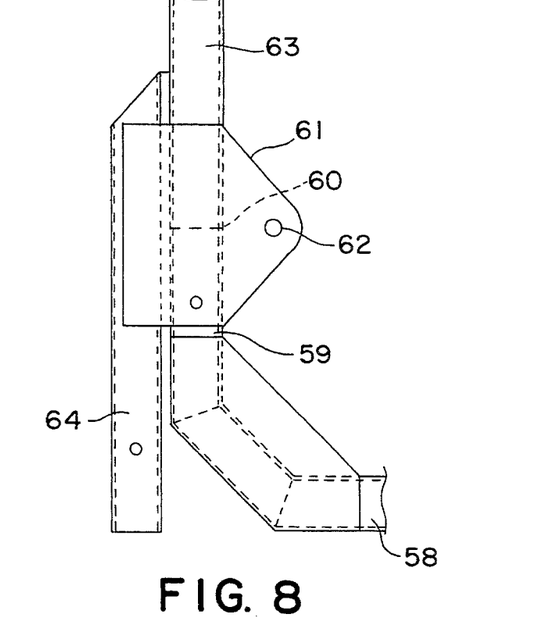
FIG. 8 is a detailed side view of the mounting means illustrated in FIG. 6.
Figure 9:
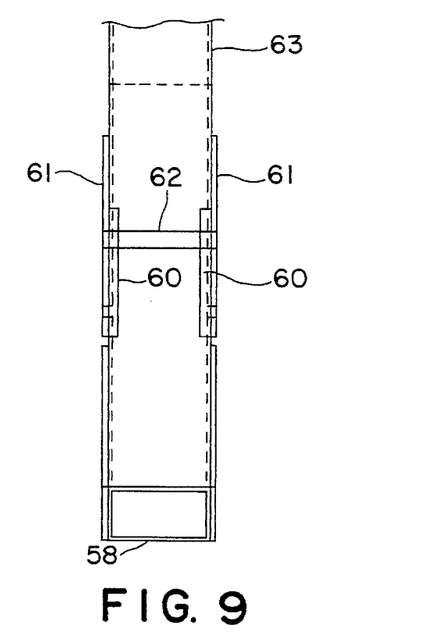
FIG. 9 is a detailed front view of the mounting means illustrated in FIG. 6.

The mountings 60 are hingedly connected to respective opposing plate like members 61 by a pin 62. The plate like members are connected to and separated by an upwardly extending post 63 and a downwardly extending post 64. The posts 63 and 64 each include a plurality of mounting apertures 65 formed therein along the length thereof.

The foot support assembly of the master control assembly 100 includes an upwardly inclined foot rest 66 on which there is mounted a pair of foot pedals 67 and 68.

The foot pedal 67 constitutes part of the direction control means which enables the user to selectively control movement of the transportation means in either a forward or a reverse direction. The foot pedal 67 is electrically or hydraulically operatively connected to the drive means and wherein depression of the pedal 67 with the toe of the user's foot results in increasing forward motion of the vehicle assembly, limited by the maximum speed as determined by the maximum speed control means, and wherein depression of the pedal with the heal of the user's foot results in increasing rearward motion of the vehicle, again limited by the maximum speed. The pedal 67 is preferably maintained in a neutral or inoperative position by biasing means, not shown.

Figure 11:
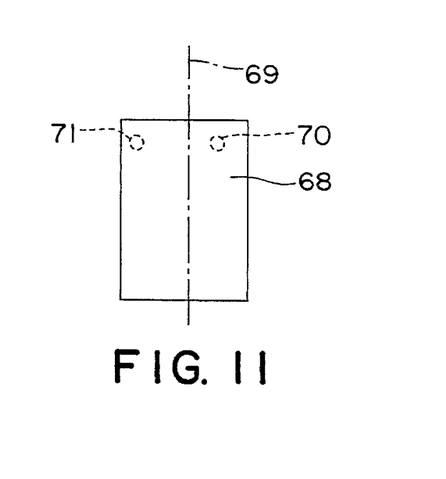
FIG. 11 is a schematic plan view of steering actuation means constructed in accordance with the present invention.

The foot pedal 68, or steering actuation means, is capable of pivotal movement about a longitudinal axis 69 whereby depression of the right side of the pedal 68 actuates a switch 70 positioned therebelow which is electrically connected to a solenoid controlling the extension of the hydraulic ram connected to the right forward wheel 27. Similarly, depression of the left side of the pedal 68 actuates a switch 71 positioned therebelow which is electrically connected to a solenoid controlling the extension of the hydraulic ram connected to the left forward wheel 27 and whereby in use, the longer the switches 70 and 71 are actuated the greater will be the rotation of the driven wheels 27.

The foot support assembly of each of the slave control assemblies 101 includes an upwardly inclined foot rest 66 on which there is mounted a single foot pedals 72.

Figure 13:
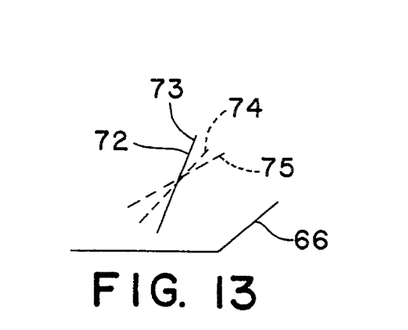
FIG. 13 is a schematic plan view of direction control means constructed in accordance with the present invention.

The foot pedal 72 constitutes part of the direction control means which enables the user to selectively control movement of the transportation means in either a forward or a reverse direction. The foot pedal 72 is electrically or hydraulically operatively connected to the drive means and wherein depression of the foot pedal between its inoperative position 73 and a neutral position 74 will cause the drive means to operate at decreasing speeds or, when in the neutral position to cease driving the mobile support means and hence cause the vehicle assembly to come to a halt. Further depression of the foot pedal 72 beyond the neutral position 74 such as illustrated by the numeral 75 will cause the drive means to operate in reverse at gradually increasing speeds.

Preferably the direction control means when not required is maintained in an inoperative position by biasing means, not shown, whereby the transportation means is permitted to travel in a forward direction at the maximum speed dictated by the maximum speed control means.

Each user support assembly 23 is also provided with two applicators or spray guns 76 having inverted cone shaped direction means 77 fitted to the respective nozzles thereof for directing weed killing chemicals onto selected weeds. The spray guns 76 are each connected by way of respective hoses 77 to a storage tank 78 mounted on the platform 26. The storage tank 78 includes an inlet 79 and level indicating means 80 for indicating the quantity of liquid stored therein.

Each user support assembly 23 is also provided with a retractable canopy 81 which extends forwardly from the post 62 so as to shield a user 82 from the effects of the sun. Preferably each canopy 81 is detachably mounted on a respective user support assembly 23 and wherein mounting means permits rotation of the canopy about a vertical axis.

Figure 7:
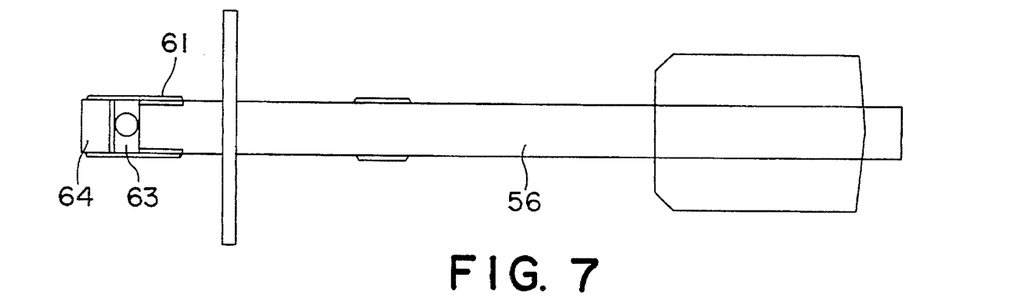
FIG. 7 is a plan view of the mounting means illustrated in FIG. 6.

The vehicle assembly 20 also includes support means 83 for supporting two user support assemblies 23 forward of the transportation means 25 including a horizontally disposed supporting frame member 84 extending outwardly therefrom and mountings located at either end of the frame member for the mounting of a respective user support assembly 23 on the frame member 84. The mountings 90 include a pair of mounting flanges 85 which are secured to the upper and lower surfaces of the frame member 84 and which provide support for a sleeve 86 adapted to slidably receive posts 63 and 64.

The posts 63 or 64 are retained in a respective sleeve 86 by pins 87 which extend through aligned apertures 88 and 65 in the walls of the sleeve 86 and the posts 63 and 64 respectively.

The vehicle assembly 20 is also provided with two arm members 89 which extend outwardly from opposing sides of the transport means 25 and which may be used to support at least one user support assembly 23 respectively in a remote position to the side of the vehicle assembly 20. The arm members 89 are hingedly connected to the transportation means 25 thereby allowing them to be folded back against the rearwardly tapered sides of the platform 26 when not required or during transport of the vehicle assembly on road transport. As before, the user support assemblies are mounted on the arm members 89 using mountings 90.

In use, the vehicle assembly may be driven along the furrows between rows of crops such that each user support assembly 23 is positioned directly above a respective furrow and wherein the user support assemblies 23 are each spaced two furrows apart. Each user 82 seated in a respective chair 52 is equipped with two spray guns 76 which he or she may hold in their respective hands and whereby they may lean to their left or right in order to spray weeds contained in crop rows with weed killing chemicals.

The user seated on the master control support assembly 100 may steer the vehicle assembly in generally a sideways direction by depressing the right side of the foot pedal 68 if he or she wishes to turn to the right, or by depressing the left side of the foot pedal if he or she wishes to turn to the left.

The user seated on the master control support assembly 100 in addition to being able to set the maximum speed at which the vehicle assembly may travel by way of maximum speed control means, is also able using the pedal 67 to control the motion of the vehicle assembly in both forward and reverse directions, ie. by pressing on the pedal 67 with his or her toe the vehicle will travel in a forward direction. Similarly, by pressing down on the pedal 67 with his or her heel the vehicle assembly will travel in a reverse direction.

Each of the other users seated on the slave control support assemblies, should they miss a weed, have the ability to reverse the vehicle assembly, independent of the other users, using the direction control means provided, namely by depressing the foot pedal 72 with their foot beyond the neutral position 74.

Once the user has sprayed the weeds that he or she has missed, he or she may relieve the pressure exerted on the pedal 72, or press down on the pedal with his or her heel until the toe of the pedal moves beyond the neutral position 74, thereby accelerating the vehicle assembly in a forward direction.

It is believed that as a consequence of the inclination of the drive wheel support arms 29 the vehicle assembly when following a furrow, will exhibit a tendency to travel in a substantially straight direction along the length furrow. As a consequence, the master controller is free to concentrate on spraying weeds rather than worrying about the direction in which the vehicle assembly is travelling.

It will of course be realised that the above has been given only by way of illustrative example of the invention and that all such modifications and variations thereto as would be apparent to persons skilled in the art are deemed to fall within the broad scope and ambit of the invention as defined in the appended claims.

We claim:

1. A vehicle assembly for use in agriculture including:

transportation means capable of movement in both a forward and a reverse direction;

drive means for driving said transportation means in both forward and reverse directions;

a plurality of user support assemblies supported on said transportation means in an elevated position above the ground, at least some of said user support assemblies being adapted to support a user in an aspect suitable for performing an agricultural operation;

said user support assemblies include a master control user support assembly and a slave control user support assembly;

said master control support assembly having directional control means for selectively controlling the movement of the vehicle assembly in either a forward or a reverse direction; and steering means for steering the vehicle assembly and wherein said slave control user support assembly includes directional control means for selectively controlling movement of the vehicle assembly in either a forward or a reverse direction.

2. A vehicle assembly for use in agriculture as claimed in claim 1, wherein said directional control means of said slave control user support assembly is adapted to override said directional control means of said master control user support assembly.

3. A vehicle assembly for use in agriculture as claimed in claim 2, wherein said directional control means of said slave control user support assembly is operable by a part of a user's body other than the user's hands.

4. A vehicle assembly for agriculture as claimed in claim 1, wherein said steering means is operable by a part of a user's body other than the user's hands.

5. A vehicle assembly for use in agriculture as claimed in claim 1, wherein said master control user support assembly is provided with maximum speed control means for controlling the maximum speed at which said transportation means may be driven and wherein said directional control means of said slave control position is adapted to override said maximum speed control means.

6. A vehicle assembly for use in agriculture as claimed in claim 1, wherein said slave control user assembly is provided with spraying apparatus.

* * * * *